United States Patent
May (10) Patent No.: US 10,352,057 B2
(45) Date of Patent: Jul. 16, 2019

(54) CHANNELED RETRACTABLE VEHICLE COVER

(71) Applicant: Joshua May, Twin Peaks, CA (US)

(72) Inventor: Joshua May, Twin Peaks, CA (US)

(*) Notice: Subject to any disclaimer, the term of this patent is extended or adjusted under 35 U.S.C. 154(b) by 0 days.

(21) Appl. No.: 15/673,275

(22) Filed: Aug. 9, 2017

(65) Prior Publication Data

US 2018/0043761 A1     Feb. 15, 2018

Related U.S. Application Data

(60) Provisional application No. 62/373,877, filed on Aug. 11, 2016.

(51) Int. Cl.

| | |
|---|---|
| *E04H 6/04* | (2006.01) |
| *B60J 11/04* | (2006.01) |
| *E04H 15/12* | (2006.01) |
| *E04H 15/58* | (2006.01) |
| *E04H 15/18* | (2006.01) |
| *E04H 15/00* | (2006.01) |
| *E04H 15/54* | (2006.01) |

(52) U.S. Cl.
CPC ............ *E04H 6/04* (2013.01); *B60J 11/04* (2013.01); *E04H 15/008* (2013.01); *E04H 15/12* (2013.01); *E04H 15/18* (2013.01); *E04H 15/58* (2013.01); *E04H 15/54* (2013.01)

(58) Field of Classification Search
CPC ......... E04H 15/00; E04H 15/36; E04H 15/38; E04H 6/04
See application file for complete search history.

(56) References Cited

U.S. PATENT DOCUMENTS

| | | | | | |
|---|---|---|---|---|---|
| 2,817,344 | A | * | 12/1957 | Teeter | ............... E04H 6/04 135/117 |
| 3,248,830 | A | * | 5/1966 | Maynard | ........... E04B 1/34305 52/298 |
| 3,438,158 | A | | 4/1969 | Kane | |
| 3,845,591 | A | * | 11/1974 | Stine | ............ E04B 1/34305 135/129 |
| 4,150,682 | A | * | 4/1979 | Ryce | ............... E04H 15/52 135/120.1 |

(Continued)

OTHER PUBLICATIONS http://racecarthings.com/amazing-motorcycle-storage-device-telescoping-garage/.
http://www.rollacover.com/index.html.

*Primary Examiner* — Noah Chandler Hawk
(74) *Attorney, Agent, or Firm* — Kirk A. Buhler; Buhler & Associates (57) ABSTRACT

Improvements in a retractable vehicle cover is disclosed. The cover can be sized and fabricated to provide protection to a number of different vehicles including cars, trucks, motorcycles and bicycles. The vehicle cover provides a fairly rigid shell to protect from objects falling on the cover and also to protect from snow loads. It uses a telescoping enclosure that retracts to occupy a small footprint when the vehicle is not in the cover. It may also include a side access door to allow a person to access the driver and or passenger door when the enclosure covers the vehicle. A power mechanism can extend and retract the cover. Seal not only protect from wind, snow, sand storm, extreme temperature or weather and rain, but also from rodents and insects that can accumulate in a vehicle if it is left unattended for a period of time.

7 Claims, 5 Drawing Sheets

(56) References Cited

U.S. PATENT DOCUMENTS

| | | | |
|---|---|---|---|
| 4,583,331 A | 4/1986 | Hunt et al. | |
| 4,944,321 A | 7/1990 | Moyet-Ortiz | |
| 4,951,993 A | 8/1990 | Taboada | |
| 4,984,399 A * | 1/1991 | Taylor | E04H 6/04 160/113 |
| 5,013,079 A | 5/1991 | Ho | |
| 5,044,132 A | 9/1991 | Harman | |
| 5,740,826 A * | 4/1998 | Nevin | E04H 6/04 135/133 |
| 5,746,237 A | 5/1998 | Arnic | |
| 5,751,488 A | 5/1998 | Wade | |
| 5,839,462 A * | 11/1998 | Randall | E04H 6/04 135/128 |
| 6,206,451 B1 | 3/2001 | Maano | |
| 6,430,879 B1 * | 8/2002 | Nuiry | E04B 1/34305 4/498 |
| 6,516,822 B2 | 2/2003 | Schlier | |
| RE42,198 E * | 3/2011 | LePage | E04H 6/04 160/268.1 |
| 8,171,947 B2 * | 5/2012 | Hardie | E04H 6/04 135/129 |
| 8,800,581 B1 | 8/2014 | McMaster | |
| 8,978,679 B2 * | 3/2015 | Jennings | E04H 15/38 135/130 |
| 9,765,545 B1 * | 9/2017 | Petrenko | E04H 6/04 |
| 9,777,505 B2 * | 10/2017 | Sprung | E04H 15/18 |
| 2004/0016183 A1 * | 1/2004 | Hoffman | E04H 15/38 52/64 |
| 2010/0200035 A1 * | 8/2010 | Jordache | E04H 6/04 135/96 |

* cited by examiner

FIG. 10

CHANNELED RETRACTABLE VEHICLE COVER

CROSS REFERENCE TO RELATED APPLICATIONS

This application claims the benefit of Provisional Application Ser. No. 62/373,877 filed Aug. 11, 2016 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a vehicle cover. More particularly, the present channeled retractable vehicle cover creates vehicle cover that has accordion channels. The cover can be expanded and retracted to cover a vehicle.

Description of Related Art including information disclosed under 37 CFR 1.97 and 1.98.

Many people live in houses apartment or other dwellings that do not have a garage or the person may not have room in their garage and must park a vehicle outside. There is a need for a vehicle cover that can be placed in an outside area and can be quickly deployed to cover a vehicle to provide protection. A number of patents and or publications have been made to address these issues. Exemplary examples of patents and or publication that try to address this/these problem(s) are identified and discussed below.

U.S. Pat. No. 3,438,158 issued Apr. 15, 1969 to D. F. Kane discloses a Car Pod. The car pod has a flexible skin and has a front area that hinges on a rigid tubular frame to provide an opening for the vehicle. While this patent provides a covering for a parked vehicle the overall volume of the covering remains essentially the same regardless of the presence of a vehicle in the car pod.

U.S. Pat. No. 5,013,079 issued May 7, 1991 to Chao-Chuan Ho discloses a Telescopically-Operated Vehicle Canopy. The telescopically-operated vehicle canopy has a flexible covering on a plurality of tubular ribs. The ribs all pivot from a central axis to create a half-circular shell. While this provides a covering for a vehicle, the soft shell provides a high shell with additional volume above the vehicle.

U.S. Pat. No. 5,044,132 issued Sep. 3, 1991 to John T. Marman discloses a Vehicle Protective Cover Assembly. The cover assembly provides a vehicle shelter with a lifting mechanism that lifts the entire enclosure at the front of the vehicle so the vehicle can drive under the cover. The cover can then be lowered over the parked vehicle. While this patent discloses a vehicle cover, the cover has the same volume regardless of the presence of the vehicle and further requires a clearance above the vehicle to clear the open cover.

U.S. Pat. No. 6,516,822 issued on Feb. 11, 2003 to John E. Schlier discloses a Portable Canopy for use with Motor Vehicles. The vehicle canopy is a trapezoidal skin over a tubular frame and provides an opening at one end for a vehicle to enter. While this patent is a vehicle cover, the cover requires essentially the same volume regardless of the vehicle being parked under the cover or absent.

What is needed is a vehicle cover that has overlapping rigid sections that are retracted or deployed to cover a vehicle. The proposed retractable vehicle cover provides the solution with vehicle cover that can be placed in an outside area and can be quickly deployed to cover a vehicle to provide protection.

BRIEF SUMMARY OF THE INVENTION

It is an object of the channeled retractable vehicle cover that provides protection to a vehicle. The cover can be sized and fabricated to provide protection to a number of different vehicles including cars, trucks, boats, ATV's, motorcycles, bicycles etc. The enclosure can be fabricated to accommodate generic sized vehicles and can also be sized for a specific vehicle. This allows for standard or custom enclosures depending upon the need of the vehicle owner. The cover can be used for temporary deployable structure for camping, hunting and military use.

It is an object of the channeled retractable vehicle cover to provide a fairly rigid shell to protect from objects falling on the cover and also to protect from snow loads. While the enclosure is intended to protect a vehicle that is placed in an outside area, it can also be installed in a garage to provide protection from dust or from people rubbing against the enclosed vehicle.

It is another object of the channeled retractable vehicle cover to be telescoping to extend or retract. The telescoping enclosure allows the enclosure to retract and occupy a small footprint when the vehicle is not in the cover. The telescoping shell components individually retract, telescope or accordion into each other. It is contemplated that there can be four sections, but as few as two, to more than four sections can be used depending upon the length of the vehicle and the amount of space remaining after the enclosure retracts.

It is another object of the channeled retractable vehicle cover to have an access door to allow a person to access the driver and or passenger door when the enclosure covers the vehicle. Often a vehicle owner may need something in the vehicle, and rather than retract the cover to gain access to the interior of the vehicle, an access door in one or more panels can be opened to allow access to the door of the vehicle.

It is another object of the channeled retractable vehicle cover to be powered to retract and extend. The power mechanism can be similar to a garage door opener where a wireless or wired remote control is used. This allows a driver to open the vehicle cover as they approach, drive the vehicle into the enclosure and then press the remote button to have the vehicle enclosed and protected.

It is still another object of the channeled retractable vehicle cover, to have seals to provide protection from the elements. The seal not only protect from wind and rain, but also from rodents and insects that can accumulate in a vehicle if it is left unattended for a continued period of time.

Various objects, features, aspects, and advantages of the present invention will become more apparent from the

DETAILED DESCRIPTION OF THE INVENTION

Figure 1:
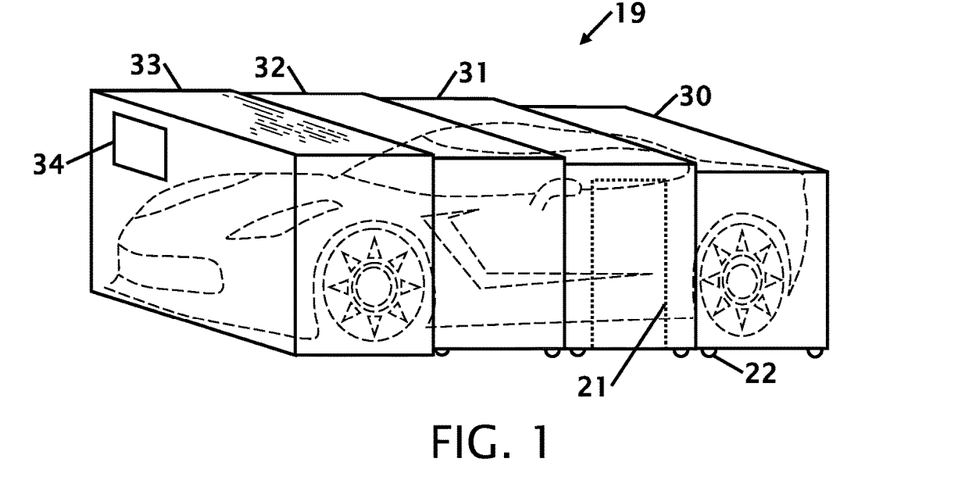
FIG. 1 shows a perspective view of the channeled retractable vehicle cover in an extended orientation with a vehicle enclosed in the cover.
Figure 2:
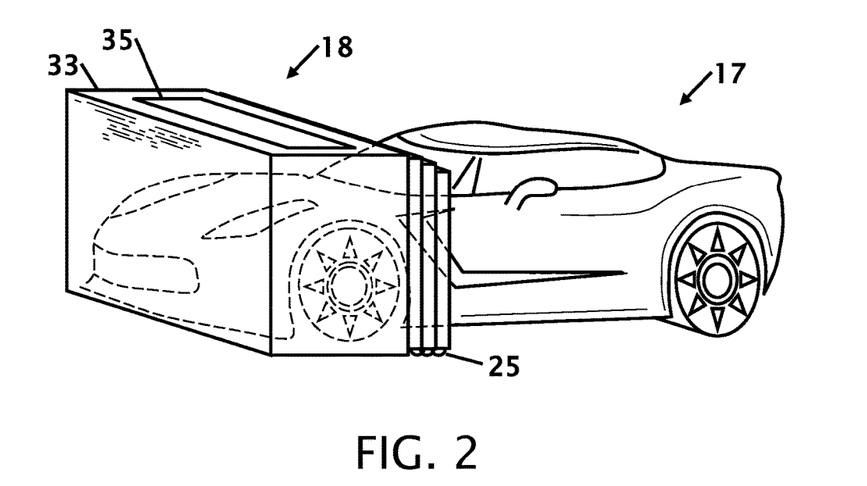
FIG. 2 shows a perspective view of the channeled retractable vehicle cover in a retracted orientation with a vehicle partially enclosed in the cover.

FIG. 1 shows a perspective view of the channeled retractable vehicle cover 19 in an extended orientation with a vehicle enclosed in the cover and FIG. 2 shows a perspective view of the channeled retractable vehicle cover in a retracted orientation 18 with a vehicle 17 partially enclosed in the cover. The extended orientation provides protection to the entire vehicle 17 from the elements and creates a temporary garage structure around the vehicle 17. There is a base housing 33 that is stationary and can be mounted or secured to the ground or hard surface. A plurality of panels 32, 31 and 30 extend and retract from the base housing 33. The height of the enclosure can be a standard height for generic vehicles or can be sized to a particular vehicle height and width. The last or smallest panel 30 must be sized to clear the roof of the vehicle 17 without making contact or rubbing on the top of the vehicle 17, with additional clearance considerations for the weight of the panels and any snow load that may be present on the panels. The enclosure may include a heater and or air conditioner 34 cooling system.

The moving panels 30, 31 and 32 have wheels 22 that allow the panels to roll along the ground. It is also contemplated that the wheels can roll in a track or guide. The embodiment in FIG. 1 shows an optional access door 21. The access door 21 to allows a person to access the driver and or passenger door when the enclosure 19 covers the vehicle 17. Often a vehicle owner may need something in the vehicle, and rather than retract the cover 19 to gain access to the interior of the vehicle 17, an access door 21 in one or more panels can be opened to allow access to the door of the vehicle 17. In one contemplated embodiment, the end rollers 25 are powered, by a powered electrically actuated wheel where the wheels are driven to move not only the section that is powered, but closes and opens all the abutted sections. The fixed base housing 33 can have a solar panel 35 that can charge batteries to allow the cover 19 to be self-contained and operate without an external power supply.

The retractable vehicle cover, 19 can be completely or partially opened to allow the vehicle 17 to enter the cover. The retractable vehicle cover, 19 needs to be sufficiently retracted to allow the door(s) of the vehicle 17 to open without contacting the sides of the retractable vehicle cover 19 panel(s).

In the embodiment shown, one static 33 and three moving panels 30, 31 and 32 are shown, but as few as one static section and one moving panel section is contemplated as well as one static panel or many moving panels or necessary to create an extremely compact design are contemplated. The panels can be manually pulled apart and pushed into a retracted orientation.

Figure 3:
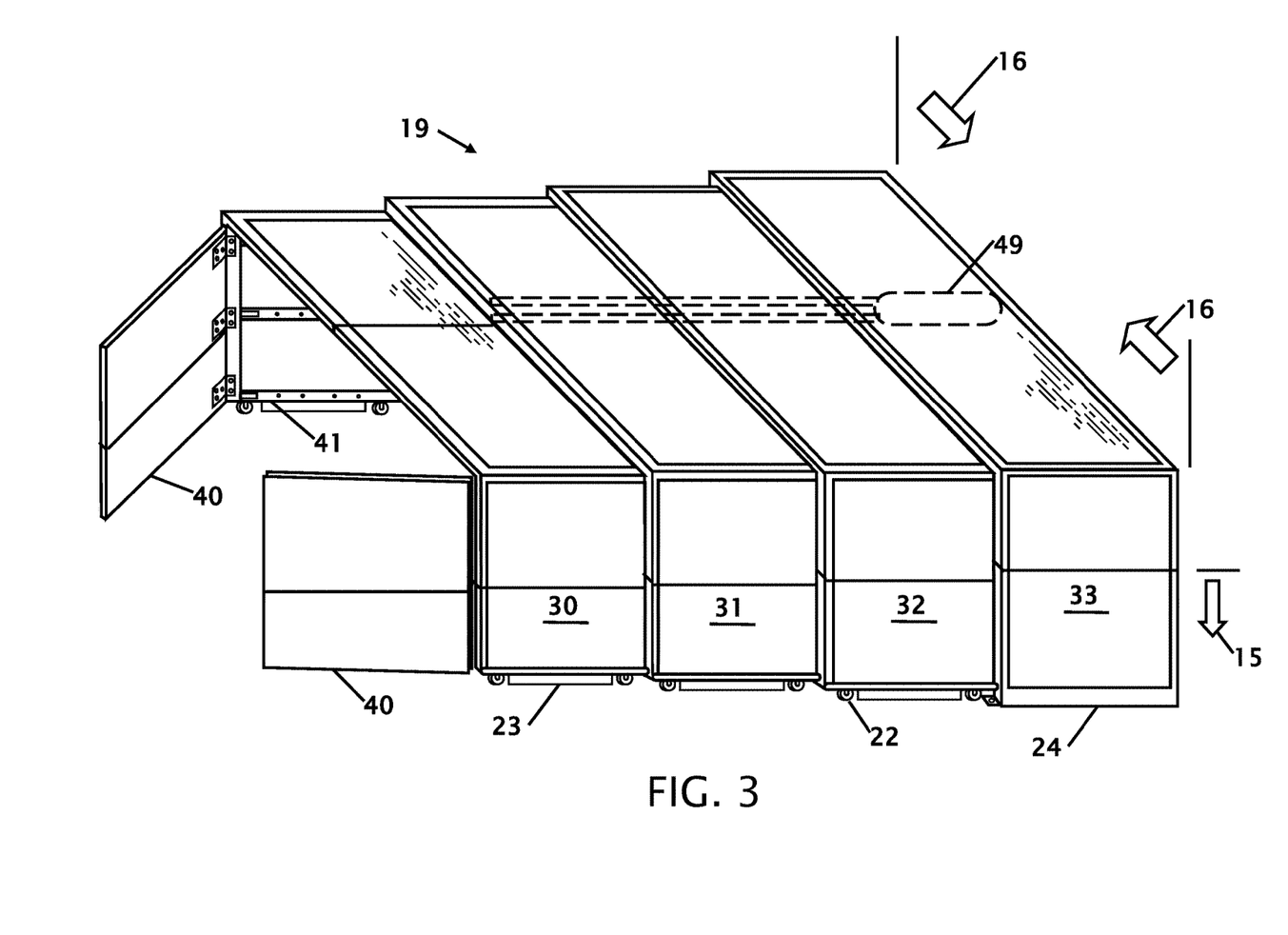
FIG. 3 shows a perspective view of the channeled retractable vehicle enclosure.

FIG. 3 shows a perspective view of the channeled retractable vehicle enclosure 19. There is a base housing 33 that is stationary and can be mounted or secured to the ground or hard surface. A plurality of panels 32, 31 and 30 extend and retract from the base housing 33. This embodiment shows wheel or casters 22 connected to the bottom of the movable panels 30-32. A skirt or bottom flashing 23 is shown between the wheels 22. In another contemplated embodiment, the skirt is placed on the outside of the wheels 22 to protect the wheels from dust and from physical elements like sticks from falling into the area where the wheels 22 track. The end doors are shown as pocket door(s) 40 that can slide down tracks 41 to for a more compact enclosure. Additionally, the structure can collapse vertically 15 and/or horizontally 16.

It is also contemplated that the base housing 33 can have a pivoting base to the channel system for driveways that are not level to allow the counter flashing to seal for areas that are not level.

While pocket doors are shown and described, other types of doors are contemplated, including but not limited to roll up door assembly installed at the top/end of panel 30, zippered polyethylene flap, a folding vertical piston assisted door as well as other options.

Housing 33 is anchored there can be a solid frame on the bottom three sides, the channel of that housing that provide square rigidity to the subsequent panels 32-30. This structure is an assembly with unique support and rigidity that assure a tight seal at each panel.

This figure also shows a power open and close mechanism 49. The power mechanism 49 can be similar to a garage door opener where a wireless or wired remote control is used. This allows a driver to open the vehicle cover as they approach, drive the vehicle into the enclosure and then press the remote button to have the vehicle enclosed and protected. Springs or other extension mechanism push the panel sections 30-32 apart, and the power mechanism can be a cable that is retracted to overcome the spring forces that extend the sections 30-32. While this particular open and close mechanism is disclosed, other gear and hydraulic mechanisms are contemplated that will accomplish a similar result. Another contemplated mechanism is utilizing an electric powered/actuating wheels (furthermost wheels to pull and push) to operate the device to open and retract the assembly as another possibility. Optionally the retraction device may be placed on the side(s), top or bottom. Electric actuated wheels are also contemplated.

Figure 4:
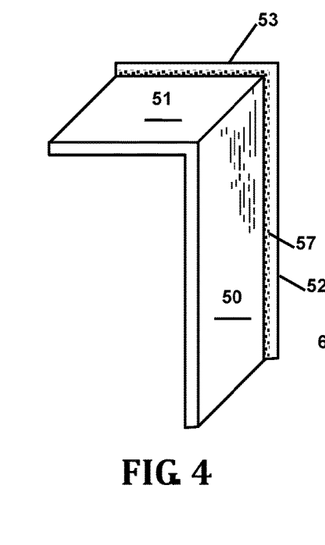
FIG. 4 shows a detail view of a portion of a panel side.
Figure 6:
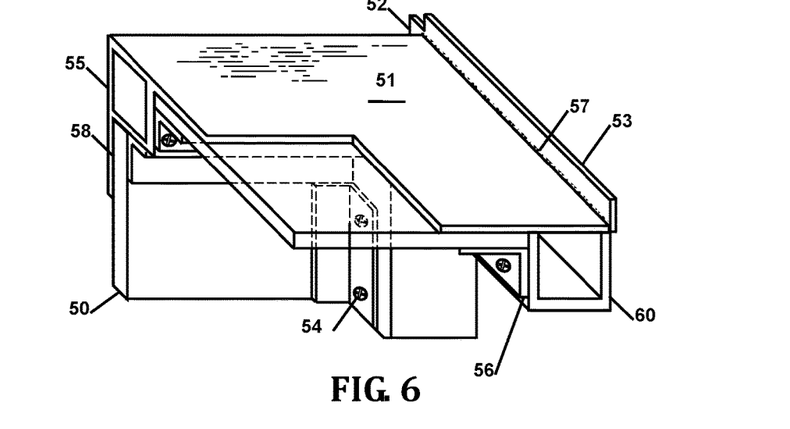
FIG. 6 shows a detail view of a portion of a panel corner.

FIG. 4 shows a detail view of a portion of a panel side and FIG. 6 shows a detail view of a portion of a panel corner. The top 51 and side 50 of each movable panel has a side or counter flashing system that eliminates water and dust from intrusion into the shelter/vehicle cover. The counter flashing may include a butyl type tape 57 or other elastomeric sealing system to prevent intrusion under and around the counter flashing 52, 53. The top 51 of each panel can be radiuses, arches or a pitch for snow loading and to drain any liquids or rain from collecting in the top 51 of the panel(s).

Figure 5:
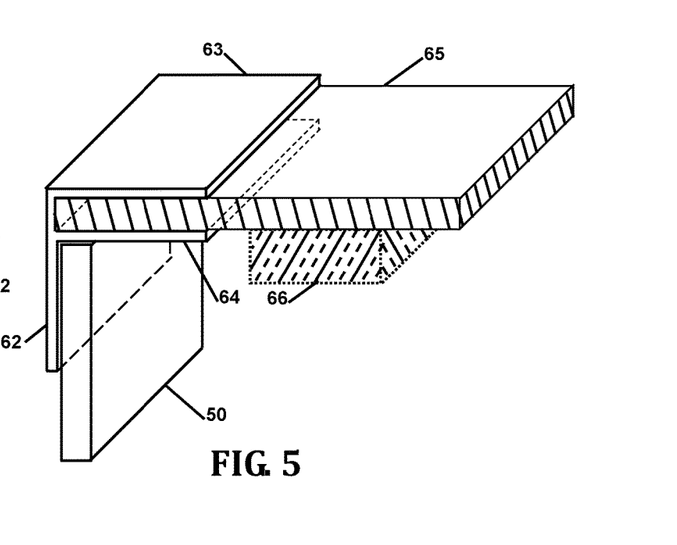
FIG. 5 shows cross-section of a corner of a panel cover.

FIG. 5 shows cross-section of a corner of a panel cover. In this embodiment, there is an extruded corner with an "F" cross-section with vertical a vertical side wall 62 and two horizontal walls 63 and 64. The extrusion can be an anodized aluminum extrusion or plastic extrusion. The horizontal walls 63 and 64 retain a cover section 65 while the vertical side wall 62 is secured to the side panel 50. The cover or skin section 65 can be a variety of materials in the preferred embodiment this is a plastic such as polycarbonate, but other materials like fiberglass, waterproof cardboard, ABS, PVC and polymer are contemplated. An optional insulation 66 is also contemplated to maintain a temperature within the cover. With insulation 66 a heater or air conditioner can be integrated into the enclosure to maintain a temperature or heat or cool the vehicle within the enclosure prior to a person entering the enclosure or vehicle.

The preferred embodiment is anodized aluminum construction for quick manufacturing & minimal cost, pieces can be manufactured & bent to desired angles. Other frame options include plastic frames which can be built with a plastic molded skin and frame monolithically.

In FIG. 6, the system shows flashing 53 that counter flashes itself to adjacent panels on the top and sides. This system of flashing also hooks adjacent sections to push and pull adjacent sections. Optional tubular structural components 60 provides additional structural strength to the top and or side panels. Angle members 56 join structural members. One contemplated jointing mechanism is with fasteners 54 that can be used to join sections. The use of removable fasteners 54 allows the system to be shipped in a flatter container and then assembled where the retractable vehicle cover will be installed.

In one contemplated embodiment, the top 51 and side panels 50 can be fabricated from polycarbonate, glass or other materials. The side and or top panels are further bonded with a sealant 58 between the side 50/top 51 panels and the "L" angle 56 components. In the embodiments shown it uses a tubular steel frame, but high strength plastic alternatives or other composites are also contemplated.

In the preferred embodiment, the system will be made out of anodized aluminum, plastic injection molded, a square tube steel or plastic square or other composite material for the frame and steel for the channel/rail system. While these materials are disclosed, other materials are contemplated based on strength and cost.

Figure 7:
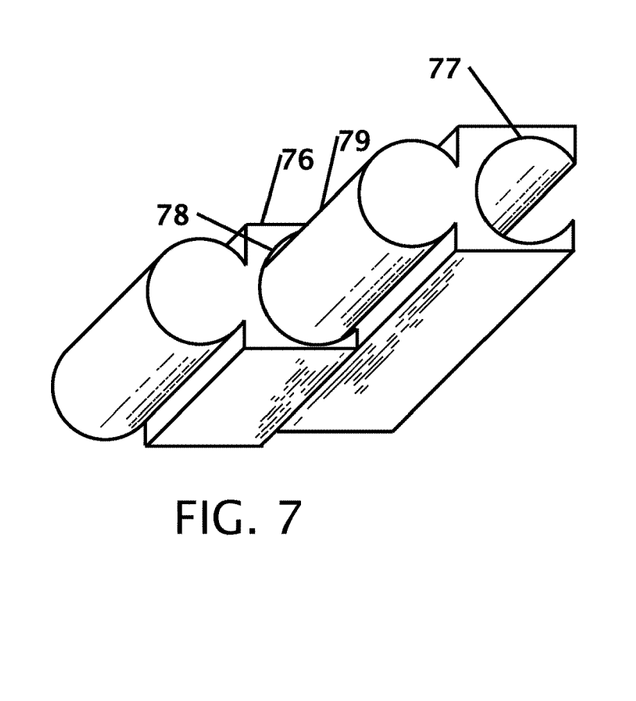
FIG. 7 shows a detail of a bottom rail guide.

FIG. 7 shows a detail of a bottom rail guide. Each rail includes a male 79 and female 77 element(s) where the male element 79 engages into a female element 78 is another rail 76. This alternative design shows another embodiment, but other embodiments with bearing or other low sliding or rolling resistance systems are contemplated. The upper horizontal supports can also serve as additional guide rods.

Figure 8:
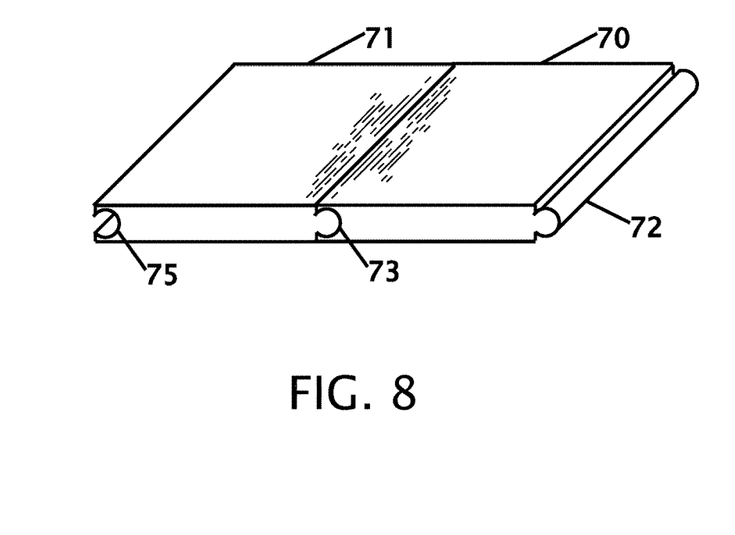
FIG. 8 shows a detail of the interlocking sections alternative design.

FIG. 8 shows a detail of the interlocking sections alternative design. These interlocking sections 70 and 71 have rounded sections 72 and 73 that engage in complimentary rounded recesses 75. While rounded interlocking sections are shown, dovetail or similar interlocking sections are contemplated that would provide a similar engagement and function.

While interlocking channels are disclosed, it is also contemplated that the enclosure can be fabricated in a non-channeled/polyethylene clad option for appropriate environments. In this embodiment, the enclosure has a method to lock the enclosure for rigidity to prevent movement by wind, this budget option may be open and closed manually.

In the embodiments shown, the system can be clad in sheet metal, polyethylene, polymers, composite, polycarbonates, or fabric as an alternative's to glass. It is also contemplated that a heater and or air conditioning unit can be added to the structure to maintain a constant temperature in the enclosure to prevent thermal damage.

Figure 9:
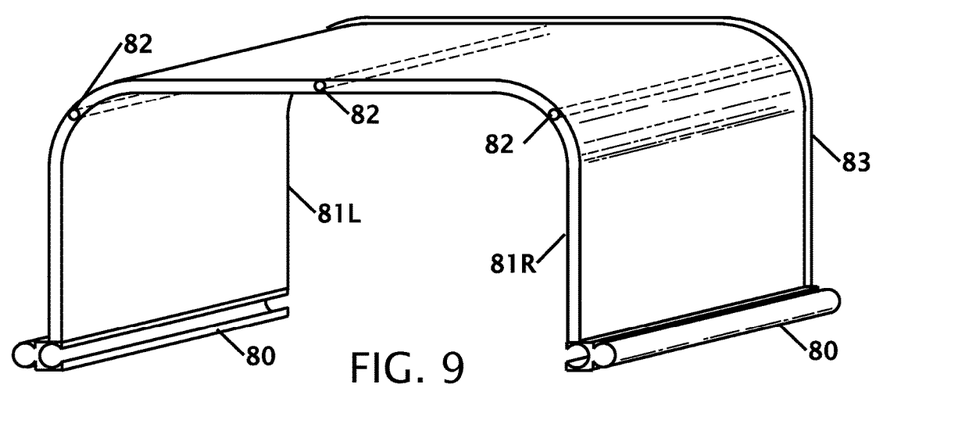
FIG. 9 shows a cover section.

FIG. 9 shows a cover section. The bottom of the section uses the interconnecting members 80 shown and described in FIG. 7. The sides and top of the enclosure uses bent or curved members 81R and 81L. These two pieces 81R and 81L could be a single piece, can be two mirror pieces, or two curved pieces with a unique horizontal span and unique vertical fillers. This configuration allows for all the sections to use common curved sides. It is contemplated that fillers or structural elements 82 can be used to strengthen the section and erect additional telescoping rail systems. The skin system is preferably from polycarbonate panels that are bent to follow frame, another contemplated embodiment is with modular plastic injection molded plastics, waterproof cardboard, polymers and composites. Flashing 83 is shown sealing an end or edge of the cover section.

Figure 10:
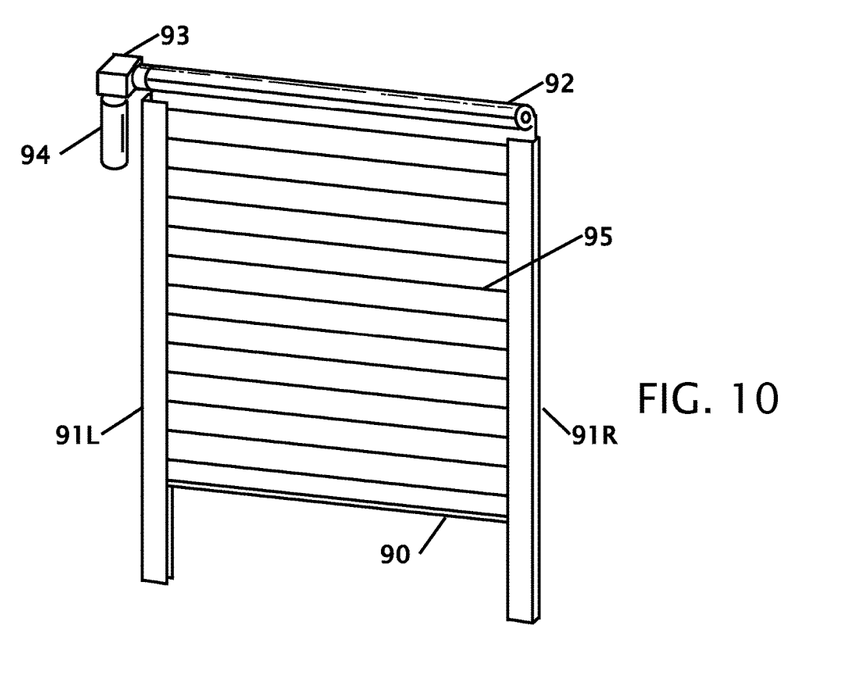
FIG. 10 shows another embodiment of an entry door.

FIG. 10 shows another embodiment of an entry door. This door is a roll-up door with multiple plastic/vinyl, composite, polymers, metal based sections 95 that are guided or tracked from the sides 91 R, 91 L. The bottom can have a seal 90 to prevent air flow under the door. The sectional elements 95 are rolled on a spool 92. A motor 94 and transmission 93 can lift and lower the multiple sections 95. The door can be controlled with a remote or with a wired button on the unit or at a distal location.

While a retractable vehicle cover for a car is shown and described in the figures and description, it should be understood that the retractable vehicle cover can be utilized for cover vehicles from cars, trucks, boats, ATV's, motorcycles, bicycles to large recreational vehicles etc.

The portable system can also be used for other purposes such as portable expanding structures that can protect people from snow, sand, storms and inclement weather that normal tents cannot protect against especially with insulation option and interior heaters/cooling systems.

Thus, specific embodiments of a retractable vehicle cover have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A retractable vehicle cover comprising:
    at least two panel sections that are configured to telescope within each other and within said at least one static panel section;
    said at least one static section and said at least two moving panel sections progressively interconnect with interlocking rounded sections;
    said at least two panel sections telescope together and further includes flashing on a top surface and both side surfaces;
    said flashing shields adjacent panels when said retractable vehicle cover is extended, and
    said adjacent panels have engaging male and female elements that track and guide said at least two panel sections and said interlocking rounded sections includes opposing male sections and female sections.

2. The retractable vehicle cover according to claim 1, wherein said at least one static section and said at least two moving panel sections are insulated.

3. The retractable vehicle cover according to claim 1, wherein said cover is overlapping rigid sections.

4. The retractable vehicle cover according to claim 3, wherein said overlapping rigid sections are clad are clad in a group of materials selected from a group consisting of polyethylene, polycarbonate, polymer, cardboard, composites, ABS, PVC, fiberglass, fabric, glass and aluminum and metal.

5. The retractable vehicle cover according to claim 1, wherein said cover includes an air conditioner and or a heater.

6. The retractable vehicle cover according to claim 1, covers cars, trucks, boats, ATV's, motorcycles, bicycles, personal self-enclosure or recreational vehicles.

7. The retractable vehicle cover according to claim 1, further includes a seal between sides of said at least two panel sections.

* * * * *